(12) United States Patent
Shah et al.

(10) Patent No.: US 11,384,285 B2
(45) Date of Patent: *Jul. 12, 2022

(54) COMPOSITE SCINTILLATORS

(71) Applicant: Radiation Monitoring Devices, Inc., Watertown, MA (US)

(72) Inventors: Kanai S. Shah, Watertown, MA (US); Andrey Gueorguiev, Burlington, MA (US); Edgar V. Van Loef, Watertown, MA (US); Gary Markosyan, Framingham, MA (US)

(73) Assignee: Radiation Monitoring Devices, Inc., Watertown, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/390,240

(22) Filed: Apr. 22, 2019

(65) Prior Publication Data
US 2020/0048544 A1 Feb. 13, 2020

Related U.S. Application Data

(63) Continuation of application No. 14/610,147, filed on Jan. 30, 2015, now Pat. No. 10,266,759.

(60) Provisional application No. 61/934,016, filed on Jan. 31, 2014.

(51) Int. Cl.
| | |
|---|---|
| *C09K 11/02* | (2006.01) |
| *G01T 1/203* | (2006.01) |
| *G01T 3/06* | (2006.01) |
| *C09K 11/77* | (2006.01) |
| *C08K 3/013* | (2018.01) |

(52) U.S. Cl.
CPC ............ *C09K 11/025* (2013.01); *C08K 3/013* (2018.01); *C09K 11/7705* (2013.01); *G01T 1/2033* (2013.01); *G01T 3/06* (2013.01)

(58) Field of Classification Search
CPC .. C09K 11/025; C09K 11/7705; G01T 1/2033
See application file for complete search history.

(56) References Cited

U.S. PATENT DOCUMENTS

| | | | | |
|---|---|---|---|---|
| 3,288,626 A | * | 11/1966 | Delacoux | G01T 1/202 428/337 |
| 4,375,423 A | * | 3/1983 | Cusano | C09K 11/02 250/483.1 |
| 6,784,432 B2 | * | 8/2004 | Wieczorek | G01T 1/2018 250/367 |
| 7,608,829 B2 | * | 10/2009 | Loureiro | G01T 1/16 250/361 R |
| 8,324,583 B2 | * | 12/2012 | Menge | H01L 31/02322 250/370.08 |
| 10,266,759 B1 | * | 4/2019 | Shah | C09K 11/025 |
| 2006/0060823 A1 | * | 3/2006 | Cooke | C09K 11/7774 252/301.36 |
| 2009/0302195 A1 | * | 12/2009 | Muenchausen | C09K 11/7706 250/200 |
| 2011/0192981 A1 | * | 8/2011 | Menge | G01T 1/203 250/362 |
| 2012/0112074 A1 | * | 5/2012 | Clothier | G01T 3/06 250/361 R |
| 2012/0223236 A1 | * | 9/2012 | Shah | C04B 35/44 250/362 |

* cited by examiner

*Primary Examiner* — C Melissa Koslow
(74) *Attorney, Agent, or Firm* — Wolf, Greenfield & Sacks, P.C.

(57) ABSTRACT

Embodiments of composite scintillators which may include a scintillator material encapsulated in a plastic matrix material and their methods of use are described.

6 Claims, 11 Drawing Sheets

PRIOR ART

COMPOSITE SCINTILLATORS

RELATED APPLICATIONS

This application is a continuation of U.S. application Ser. No. 14/610,147 (now U.S. Pat. No. 10,266,759), filed Jan. 30, 2015, which claims priority to U.S. Provisional Application No. 61/934,016, filed Jan. 31, 2014, which are incorporated herein by reference in their entirety.

FIELD

Disclosed embodiments are related to composite scintillators.

BACKGROUND

Since the availability of $^3$He is becoming scarce, it is crucial to develop new sensors, which are capable of detecting neutrons with high sensitivity. In addition, the potential dual mode of operation afforded by the simultaneous detection of gamma rays and neutrons with a single scintillator will dramatically reduce the complexity of the instruments, which will provide for their wide deployment. In order to achieve a low false detection alarm rate, the main detector requirements include high efficiency, good energy resolution, and the ability to differentiate between gamma and neutron events. While a number of new materials have been identified and are being developed at present, they are often expensive and not readily available. Efforts need to be undertaken to find better and less expensive materials for γ-ray and neutron detection.

Figure 1A:
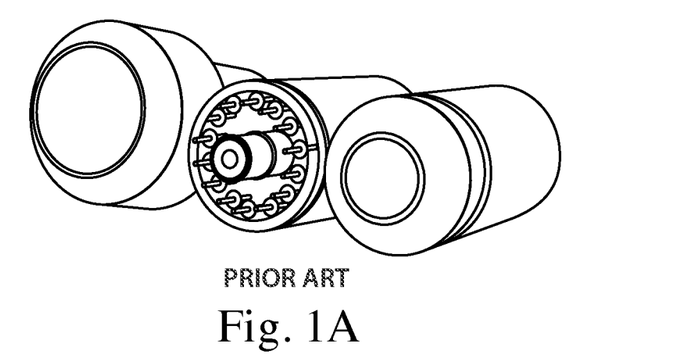
FIG. 1A shows a packaged 1" and 2" CLYC detectors.
Figure 1B:
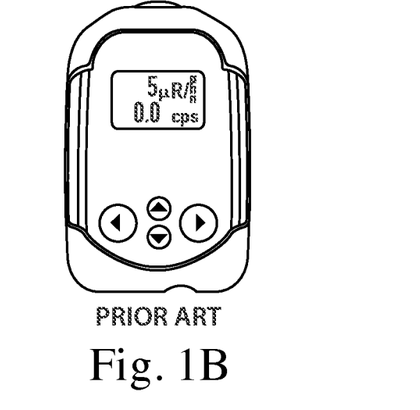
FIG. 1B shows a CLYC based Gamma-Neutron Pager.

Radiation Monitoring Devices, Inc. ("RMD") has invented a number of scintillator materials with improved performance over classical materials. Some of these materials offer thermal and fast neutron detection simultaneously with gamma ray detection, providing multimode operation. One of the first such materials is $Cs_2LiYCl_6$ (CLYC), which offers (1) improved energy resolution of better than 4% at 662 keV; (2) efficient thermal neutron detection (2× higher than $^3$He at 10 atmospheres); and (3) excellent separation between gamma and neutron particles ($>10^{-6}$). CLYC is already in a stage of intensive commercialization with 1" and 2" inch crystals becoming standard products. FIG. 1A shows 1" and 2" CLYC packaged detectors produced and offered by RMD. Detection instruments and systems based on CLYC are being developed internally and by a number of companies and national labs. As an example, in FIG. 1B is shown the Thermo-Scientific's commercial gamma-neutron pager based on CLYC. CLYC is supplied by RMD and its sister organization (Hilger Crystals).

Figure 2:
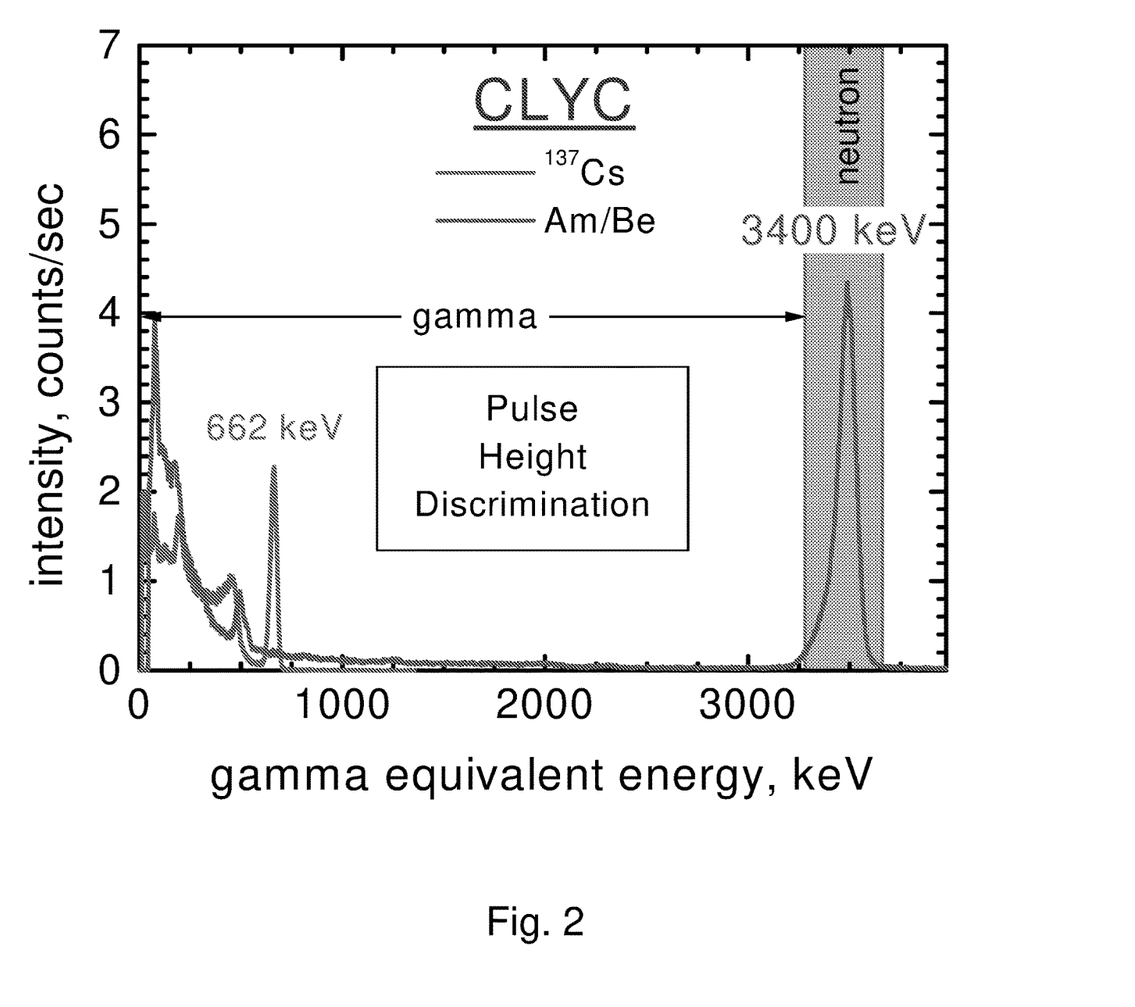
FIG. 2 Energy spectra measured with CLYC under 137Cs and 241Am/Be excitation.

FIG. 2 illustrates gamma and neutron capabilities of the CLYC material. It shows energy spectra measured with a CLYC crystal under moderated Am/Be excitation. The peak at the right side of the spectrum is due to thermal neutrons. For energy calibration purposes the graph also shows a $^{137}$Cs spectrum (red curve). Based on the position of the 662 keV peak, the neutron peak appears at ~3.2 MeV gamma equivalent energy (GEE).

These new scintillation materials have exciting properties, but they are associated with several issues which currently increase the cost of their mass deployment. First issue is the production yield. RMD demonstrated that high quality elpasolite scintillators can be grown and 1" and 2" CLYC crystals are routinely produced and delivered. However, the yield is limited due to cracking during the cooling of the ingots, defects, inclusions, and secondary phases at the both ends of the ingot. All these result in higher cost for large size scintillators. While obtaining crystals with sizes above 2"×2" is possible, currently the cost of such crystals might become prohibitive to build low cost instruments.

An additional issue with these new materials is that they are highly hygroscopic, which complicates their handling. The standard procedure is to encapsulate them in a metal enclosure with an optical window. While this process is well established and used in other "classical" scintillators like NaI:Tl or LaBr$_3$:Ce, it introduces additional light loss due to the difference in the refractive index of the crystal, window and optical readout component. The encapsulation is done in dry atmosphere, but the sealing could become compromised during the years in operation, which could lead to a degradation of the performance and long term issues.

Figure 3:
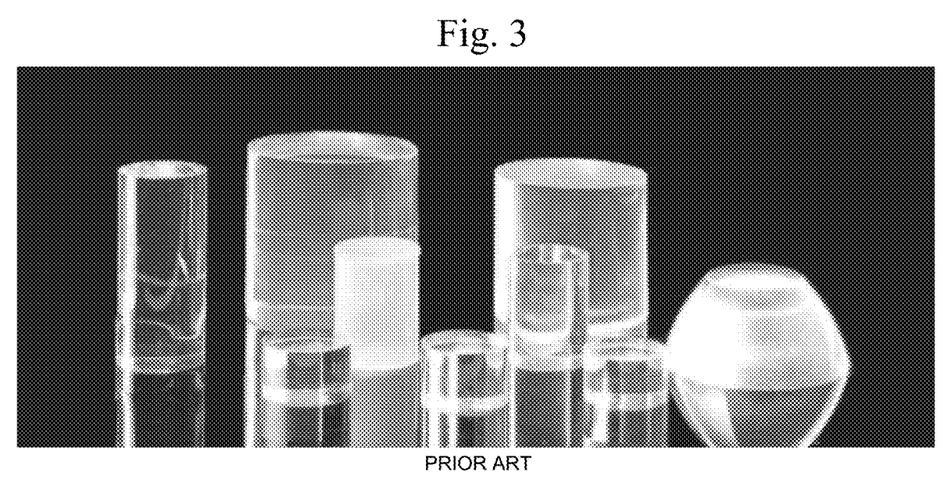
FIG. 3 Photograph of a selection of RMD's plastic scintillators with different shapes and compositions.

Recently RMD investigated novel plastic scintillators based on styrene and vinyltoluene monomers doped with wavelength shifters such as PPO for use in applications where neutron/gamma pulse shape discrimination (PSD) is required. Measurements show that the plastic scintillators fabricated at RMD have excellent optical quality, a good light yield (similar to commercial plastics such as BC-404 and BC-408), and excellent gamma-neutron PSD with a Figure-of-Merit (FOM) of >3 at 2.5 MeVee gamma equivalent energy threshold. A photograph of a selection of RMD's neutron plastic scintillators is shown in FIG. 3.

The plastic scintillators do not exhibit the same issues like the new inorganic scintillators. They have very low production cost, based on low cost components and very high, practically 100%, production yield. They can be produced in large volumes and realized in practically any desirable shape. Moreover, they are not hygroscopic, which significantly simplifies their handling and reduces the cost of their utilization.

The plastic scintillators have excellent properties, but they exhibit a number of performance limitations. First, they have low detection efficiency due to their low density close to 1 g/cm$^3$. Second, they do not have photopeak efficiency for energies above 30 keV due to low-Z constituents.

SUMMARY

In one embodiment, a composite scintillator may include a scintillator material encapsulated in a plastic matrix material. Depending on the embodiment, the scintillator material may include CLYC, $Cs_2LiYBr_6$, (CLYB), $Cs_2LiLaBr_6$ (CLLB), $Cs_2LiLa(BrxCl_{1-x})_6$ (CLLBC), and other appropriate elpasolite scinitillators. Other possible scintillator materials may also include SrI, $LiSr_2I_5$ LSI, LaBr$_3$, LaCl$_3$, NaI, and any other appropriate scintillator material. The plastic matrix material may correspond to any appropriate material including, but not limited to, polystyrene (PS), polyvinylchloride (PVC) and polymethylmethacrylate (PMMA), and Polyvinyltoluene (PVT). Additionally, in some embodiments, the plastic matrix material may also be a plastic scintillator material.

In some embodiments, a composite material may have a scintillator material loading of between about 50% to 75% inclusively though loadings both greater than and less than this range are also possible. Additionally, the scintillator material may comprise a plurality of pieces with characteristic sizes less than about 0.5 mm, 2 mm, 5 mm, or 10 mm, though other sizes are also possible. In some embodiments, a lower size limit of the plurality of pieces of scintillator material may be at least one times, or 10 times, a stopping length of alpha radiation in the scintillator material. For example, some scintillator materials may have a stopping length between about 10 µm to 20 µm which may correspond to a scintillator material size greater than 10 µm to 20 µm inclusively or 100 µm to 200 µm inclusively.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Clearly organic and inorganic scintillators are antipodes. The strength of one of the materials is the weakness of the other. To address that RMD is developing a novel technology which combines the positive aspects of inorganic and organic scintillators while suppressing or even eliminating their negative side effects. It is based on the suspension of inorganic scintillator pieces into an organic scintillator matrix. If for example CLYC scintillator is used, the composite detector can provide high gamma and photopeak efficiency, efficient thermal neutron detection and excellent neutron-gamma discrimination. As an organic matrix, a dual mode plastic scintillator can be used. It can provide large gamma and fast neutron detection volume as well as a light guide for the scintillation light generated in the inorganic material. Due to the significant difference between the light decay of the gamma and neutron events in the plastic scintillator matrix and in the CLYC scintillator, all events can be easily discriminated using pulse-shape discrimination.

The proposed composite scintillators provide the best features of the inorganic and organic scintillators, like excellent energy resolution, dual mode neutron-gamma operation, excellent neutron-gamma discrimination, all that at low production cost, approaching the cost for plastic scintillators, and large detection volumes produced in any desirable shape. In addition, this technology offers the possibility to detect fast neutrons as well, utilizing the composite detector matrix. This feature could be very useful to identify the shielding of fissionable materials based on the thermal to fast neutron ratio.

Even at this early stage of the investigation, CLYC-Plastics composite detector demonstrated better resolution compared to the classical NaI:Tl scintillators with the added benefit of efficient neutron detection and excellent neutron-gamma discrimination. While the preliminary results are based on CLYC, other materials including CLLBC might be used as well. Further, the proposed composite technology will provide detectors with the best performance to cost ratio compared to any of the currently available scintillators.

Possible benefits of this project may include producting a very low cost dual-mode detector capable of gamma ray spectroscopy with thermal and fast neutron detection. The radiation detection instrument may have the following characteristics and advantages: Good gamma ray resolution (resolution better than NaI:Tl, approaching the resolution of elpasolite scintillators (5-6% with CLYC, and 4-5% with CLLBC); Good efficiency for gamma ray detection (scintillator sizes of >⌀2"×10" are visible); Efficient detection of thermal neutrons (above 80% at 2 cm composite material); Efficient detection of fast neutrons based the use of dual mode plastic scintillator matrix; Effective separation between gamma ray and neutron events using PSD; and Compact, simple, and low power electronics The significantly lower cost of these composite detectors is based on low cost components and higher production yield for both constituents—CLYC and plastics. Since the CLYC is not a solid mono crystal, but rather collection of pieces, the production yield will be higher, potentially approaching 100%. Also since the cracks are not an issue, the CLYC crystal growth can be significantly accelerated, especially reducing the long time require for the cooling of the ingot. With respect to the plastic scintillator—the cost of the materials is very low and the production yield is closed to 100%.

The proposed system will be built around a single composite scintillator (CLYC or CLLBC in plastics), therefore, the detector design will be simpler and the detector itself more compact. So far, the detection of different types of radiation has been based on a combination of individual detectors, one for each type of radiation. For example, NaI(Tl) and 3He detectors have been commonly combined for gamma and thermal neutron detection, respectively. In addition, there is currently a shortage of 3He gas, which has increased the demand for new solutions in thermal neutron detection. The proposed detector would address this issue as well.

This technology has the potential to be truly transformative by combining the positive aspects of organic and inorganic scintillators and avoiding and even eliminating their weaknesses. The dramatically lower production cost will provide an opportunity to build low cost, high performance radiation instruments for nuclear material control and accountability applications. Hand-held dual gamma/neutron detectors will strongly benefit from this technology, which will allow their mass deployment in control of nuclear material diversion and proliferation, for accountability of the materials in nuclear facilities and in safeguards applications. Large area, low cost, gamma-neutron monitoring systems can be also realized utilizing this technology.

Figure 4A:
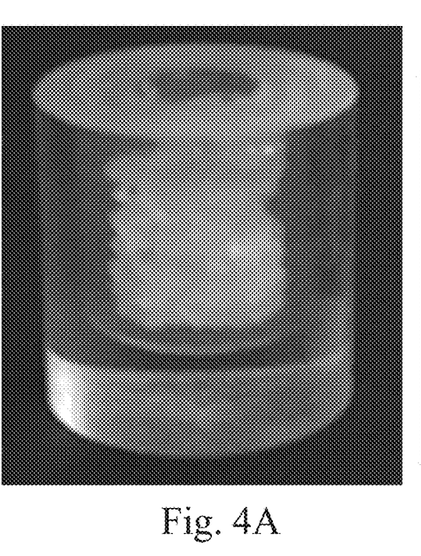
FIG. 4A is a photograph of a 1" diameter by 1" composite CLYC-Plastic detectors produced in RMD's.
Figure 4B:
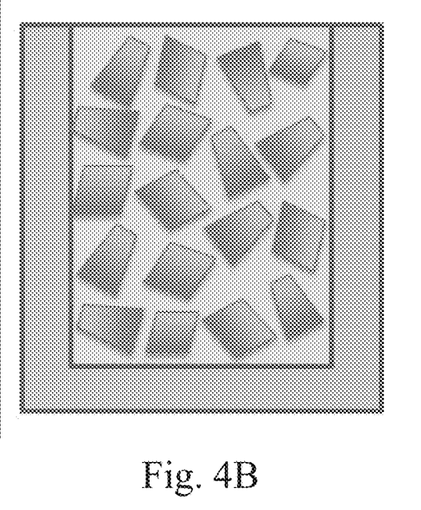
FIG. 4B is a sketch of a composite scintillator structure.

To prove the principle, we produced several prototypes of composite detectors using the described technology, but instead of dual mode plastic scintillator we used standard plastic. FIG. 4A shows a photograph of a composite CLYC-Plastics detector produced in RMD. The size of the detector is Ø1"×1". The CLYC pieces were suspended in a Polymethylmethacrylate (pMMA or MMA later in the text) plastics. FIG. 4B shows a sketch illustrating the structure of the composite detector. It consist of a plastic shell with a well. The CLYC pieces are placed in the well and suspended in liquid plastics. After the polymerization, they become incorporated in the plastic body. The CLYC pieces had a volume loading of 75% in the plastic body. The plastic material of the shell and in the well has the same composition and after polymerization they fuse in a single plastic matrix. In this particular arrangement the scintillation elements for gamma and neutron detection are CLYC pieces, while the plastic matrix is only used to transport the light from all parts of the composite scintillator.

Figure 5A:
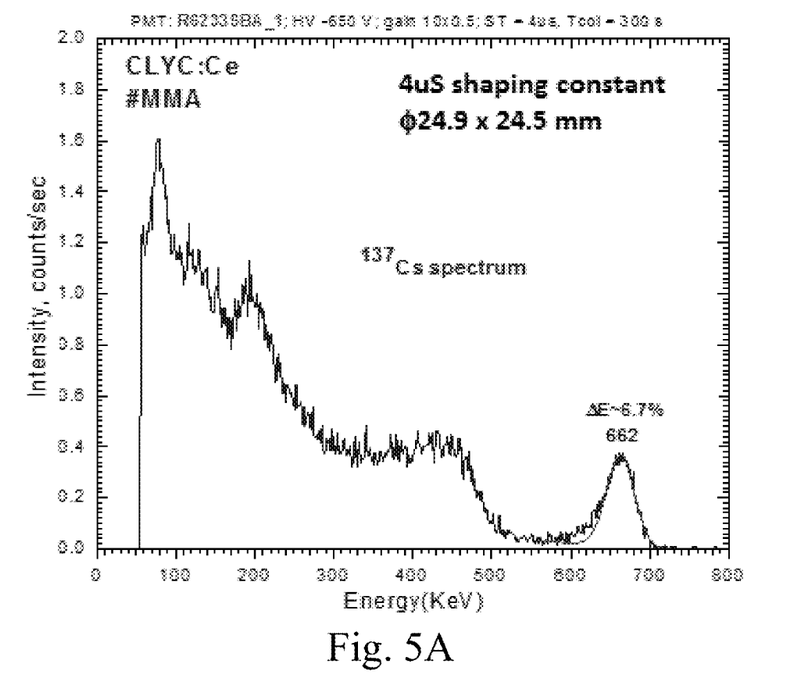
FIG. 5A is an energy spectra under 137Cs irradiation of 1" diameter by 1" composite CLYC-Plastic detectors at 4 µS shaping constants and energy resolution at 662 KeV is 6.7%.
Figure 5B:
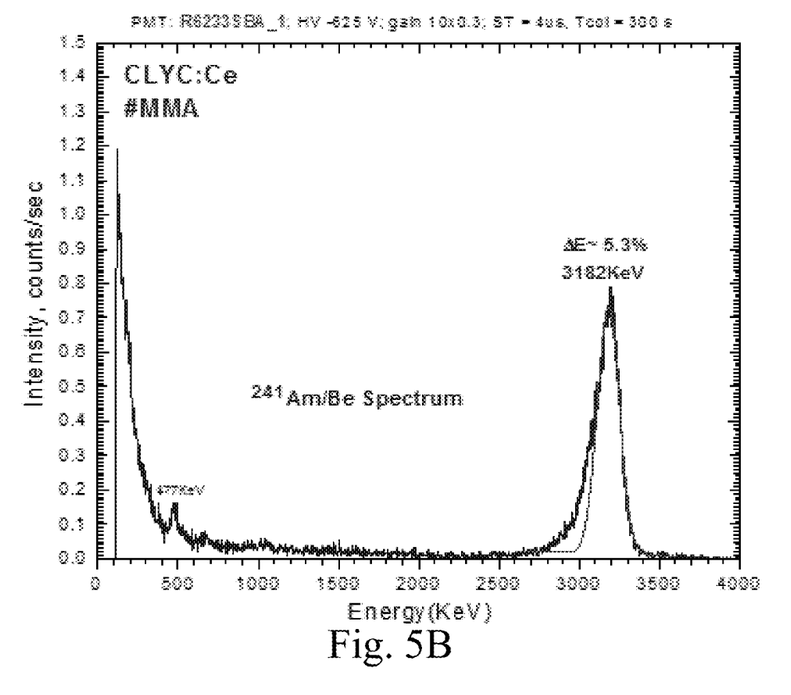
FIG. 5B is an energy spectra under neutron irradiation produced by 252Cf of 1" diameter by 1" composite CLYC-Plastic detectors at 4 µS shaping constants and energy resolution of 5.3% and gamma equivalent energy of 3.1 MeV of the neutron peak was measured.

The experimental results confirmed our expectations for high performance, multi-mode detectors. We obtained with Ø1"×1" CLYC—Plastics composite detector a gamma resolution of 6.7% at 662 keV measured under 137Cs irradiation (see FIG. 5A). The detector has a good neutron detection capability due to the 6Li in the CLYC material. For the thermal neutron resolution we obtained 5.3% at >3 MeV gamma equivalent energy measured under AmBe irradiation (see FIG. 5B).

Figure 6A:
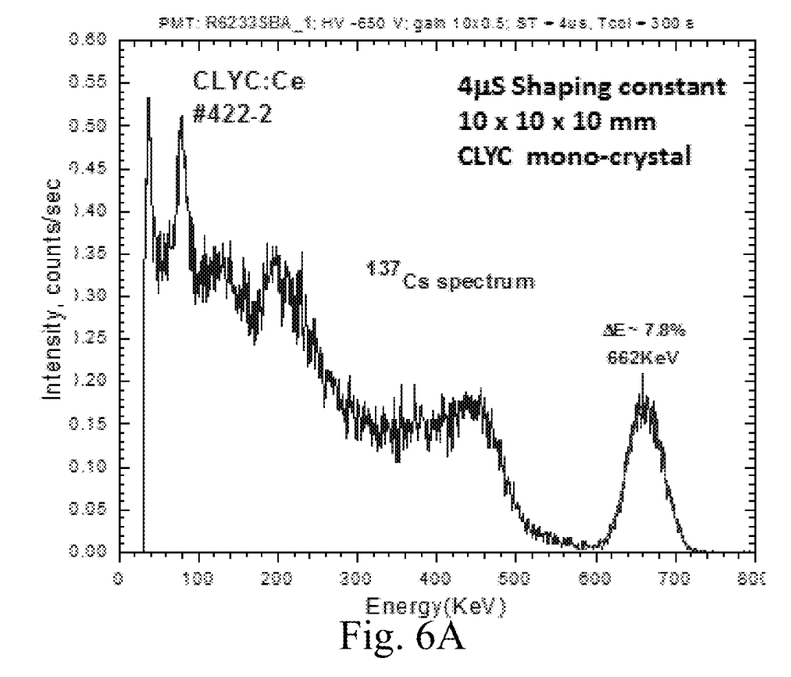
FIG. 6A is an energy spectra under 137Cs irradiation of CLYC crystal (used to produce the composite detector) at 4 µS shaping constants and energy resolution at 662 KeV is 7.8%.
Figure 6B:
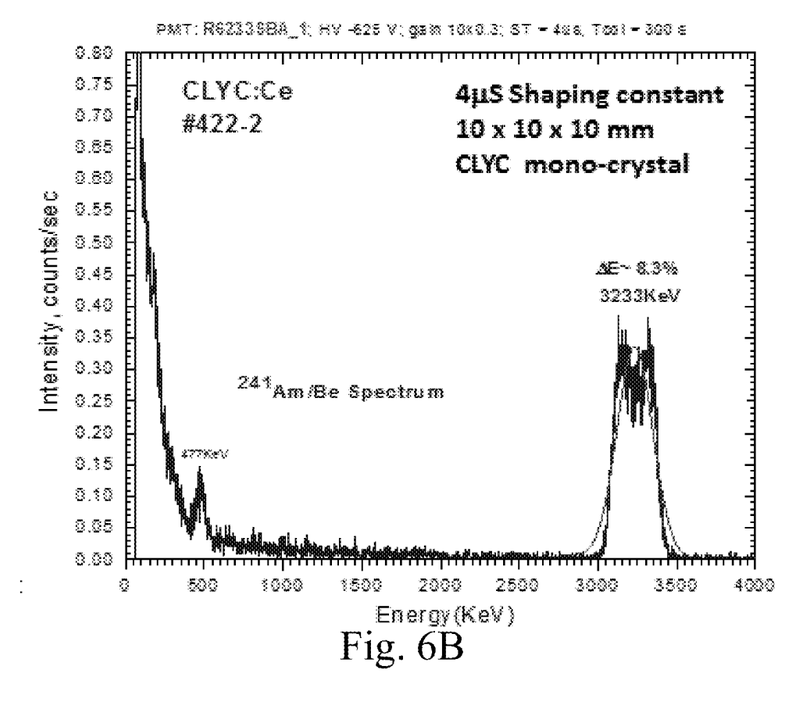
FIG. 6B an energy spectra under neutron irradiation produced by 252Cf of the same crystal at 4 µS shaping constants and energy resolution of 8.3% and gamma equivalent energy of 3.3 MeV of the neutron peak was measured.

The inorganic pieces for these experiments we produced by braking a single CLYC crystal. Before braking it we evaluated its performance—gamma resolution and neutron detection. The reason for these initial measurements was to obtain information how the performance changes due to the transition from single crystal to composite scintillator. FIGS. 6A and 6B shows the results from the initial measurements. Surprisingly the single crystal had slightly worse gamma and neutron resolution compared to the composite detector: 7.8% vs. 6.7 and 8.3% vs. 5.3%, while both have comparable light yield. The measurements indicate that the original crystal was not a good quality sample. It had a visible crack which explains the double neutron peak at 3.2 and 3.4 MeV and broader gamma peak at 662 keV. One possible explanation to these unexpected improvement of the performance after braking the crystal and suspended it in plastics is that by this arrangement the light collection from all parts of the scintillator is homogenized. Any internal "mirrors" due to cracking are replaced with light transparent media.

Figure 7A:
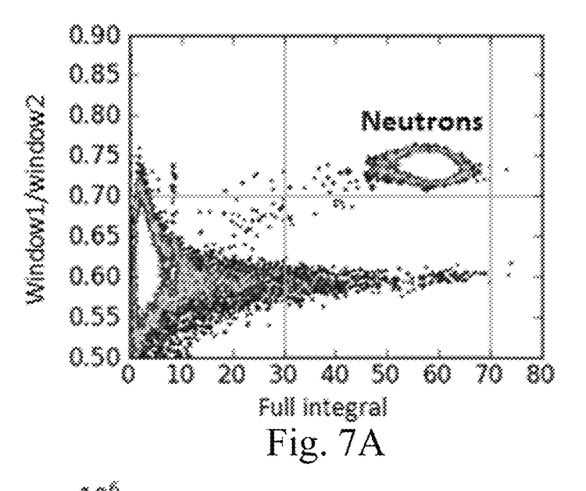
FIG. 7A is a pulse shape discrimination scatter plot recorded for a CLYC-plastic composite detector under 252Cf excitation.
Figure 7B:
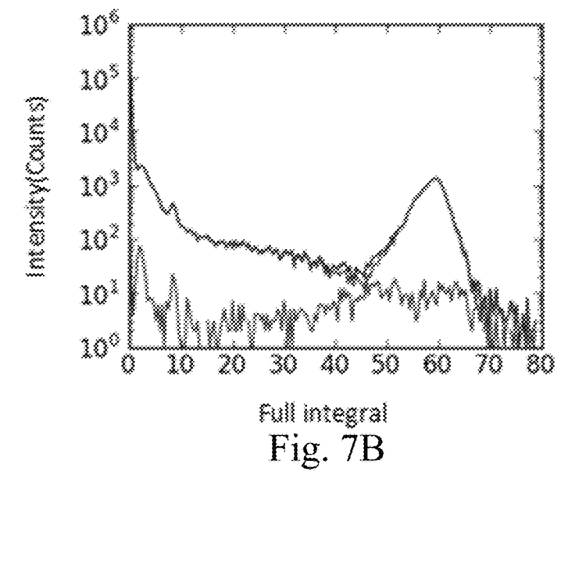
FIG. 7B is energy spectra corresponding to gamma and neutron radiation for the CLYC-plastic composite detector used in FIG. 7A.
Figure 7C:
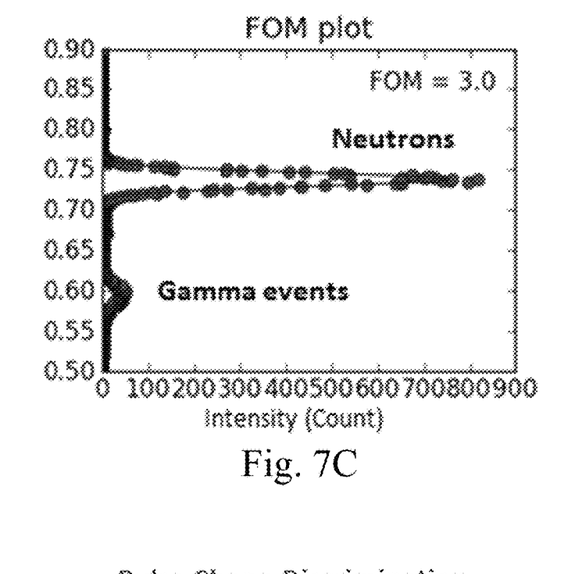
FIG. 7C is a Figure of Merit (FOM) plot showing the separation of the gamma and neutron events for the CLYC-plastic composite detector used in FIG. 7A.

An excellent separation between the gamma and neutron events was observed with the new composite detector. FIG. 7A shows a PSD scatter plot recorded for a Ø1"×1" CLYC—Plastics composite detector under 252Cf excitation. FIG. 7B shows the energy spectra corresponding to gamma (green line), neutrons (red line), and combined (blue line) radiation. FIG. 7B shows the Figure of Merit (FOM) which illustrates the projection of the gamma and neutron events. The plot illustrates the excellent separation of different events which is demonstrated by a FOM of 3.0.

These results are impressive considering the early stage of the development. We obtained energy resolution for gamma and neutron events and neutron-gamma discrimination close to the results which can be obtained with moderate quality CLYC single crystal. While the preliminary results are based on CLYC and plastic composition, the Phase I study will include selection of the inorganic scintillation material. We will consider in our research other elpasolite scintillators, like CLLBC, with the goal to find the optimal combination of organic and inorganic materials.

The proposed composite detector can provide a high performance solution for nuclear material accountability and safe guard applications at production cost approaching that of plastic scintillators. The technology can deliver large detection volumes without the negative impact and limitations of the crystal growth process. Any shape of the detector can be realized, which offers significant application flexibilities. Since the elpasolite pieces are suspended in a plastic scintillator matrix, they are protected from moisture.

Polymer Preparation

This task will involve mainly plastic matrix fabrication and investigation of the compatibility of the plastic and elpasolite materials. While the ultimate goal is to use dual mode plastics to obtain fast neutron detection, in Phase I we will develop the CLYC-plastic technology utilizing plastic only as matrix to transport the light and to be used as a moderator for fast neutrons.

The basic principle of the fabrication of plastics involves the preparation and purification of the monomers; polymerization of the monomers followed by heat treatment and post-processing operations such as cutting, grinding and polishing.

Purification of the Monomers

The first step in the fabrication of the organic-inorganic composite scintillators is the filtration and purification of the monomers to remove impurities, such as inhibitors, water and small particulates that may be present in the monomer. Removal of the inhibitor is most important since it literally "inhibits" the polymerization of the monomer. Removal of the water is critical for the success of the technology since CLYC and other elpasolite materials are highly hygroscopic. Excessive moisture and inclusions in the monomers will damage the surface of the CLYC pieces and will significantly reduce the light yield of the composite scintillator.

Moisture can be removed from the monomers by using sodium hydroxide or molecular sieves. Alternatively, vacuum distillation can be performed. Next, a glass column is packed with activated alumina and the monomer is slowly passed through the column. The inhibitor is removed by the chromatography process, while the pure monomer is collected at the bottom of the column.

Polymerization

The second step in the fabrication of the plastic scintillators will be to determine the optimal method of polymerization: 1) thermal, 2) anionic, or 3) cationic. The interaction with the elpasolite material will be the criteria to select the method. The actual polymerization will be performed at temperatures between 60 to 140° C. for a period of 1-2 weeks, depending on the size and volume of the scintillator to be made. Thermal polymerization will be done under oxygen-free conditions and at temperatures that do not allow the monomer to boil. Should bubbles appear in the monomer/polymer, the temperature will be adjusted depending on the type and polymerization degree of the specimen. The container with the monomer will be heated evenly throughout to prevent excessive localized polymerization and to provide homogeneous heat distribution inside the monomer. Uneven heat distribution could lead to gas bubble formation and excessive laminar pressure which will prevent bubbles from floating to the top and escaping the monomer/polymer. The progress of polymerization will be monitored daily in order to determine whether the process has been fully completed.

Compatibility Studies

Figure 8A:
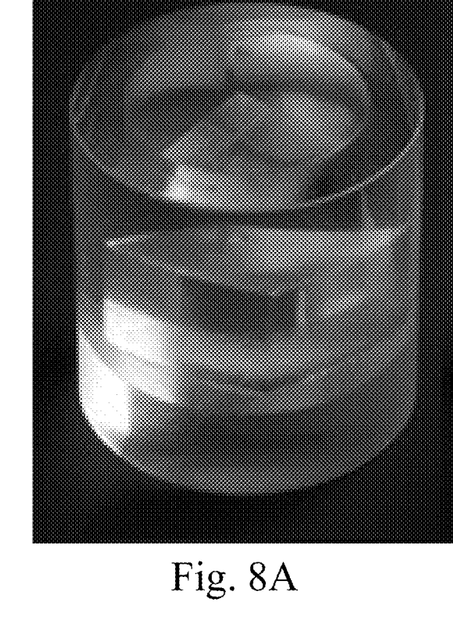
FIG. 8A is a photograph of a 1" diameter by 1" composite CLYC-Plastic detectors with a single crystal embedded in the plastic.

Important component of the composite technology is the compatibility of the plastic scintillator components and the polymerization process with the CLYC material. We will initially experiment with CLYC scintillators incorporated into a range of different plastic matrices, such as polystyrene (PS), polyvinylchloride (PVC) and polymethylmethacrylate (PMMA). The main reason for this study is that we conducted several experiments with CLYC incorporated into PMMA with dramatically different outcome. For example FIG. 8A shows a scintillator with very good optical and spectroscopic performance. However some of scintillators were not transparent, the light yield and resolution were poor FIG. 8B. There are several possibilities for these different outcomes, ranging from a change in the polymerization process to initial monomer purity, mainly the moisture content in the initial material. These issues will be investigated in detail in Phase I.

Scintillator Material

Figure 8B:
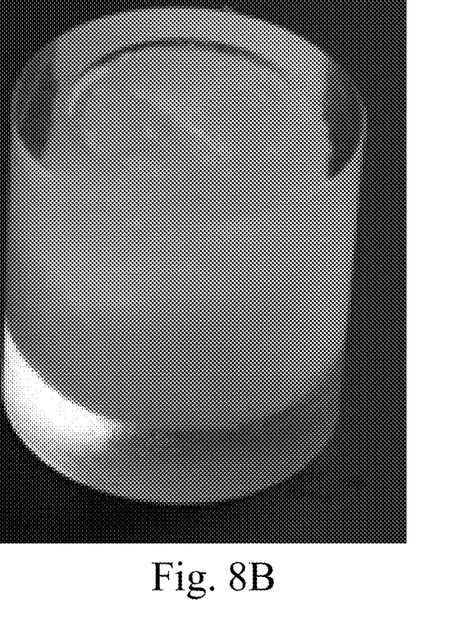
FIG. 8B is a photograph of a 1" diameter by 1" composite CLYC-Plastic detectors with a powdered crystal embedded in the plastic.

The particle size is important to obtain optimal gamma and neutron efficiency and high light yield. We will experiment with different size of the particles. Our preliminary observations are that the performance improves by increasing the size of the particles. FIGS. 8A and 8B show two extremes: left scintillator is build using a single piece CLYC crystal, and right—fine CLYC powder. The resolution was 6.5% and 15% at 662 KeV, respectively. While the resolution on the large single CLYC piece was comparable to the results of the scintillator with multiple pieces (see FIG. 4) at 6.6 to 6.9% in both cases, the resolution of the scintillator with fine powder was significantly worse at 15%. In addition, the neutron detection efficiency of the 'powder' scintillator was lower. One possible explanation is that the smaller particle will have larger "wall effect", i.e. the probability of the neutrons to interact close to the surface of the particle dramatically increases with decreasing the size of the particles. Also reducing the size of the particles increases the probability for light scattering and correspondingly light losses. More experiments are required to investigate these effects and to define the optimal size of the CLYC/CLLBC inclusions. Our preliminary observations are that the particle sizes above 2-5 mm deliver more consistent light yield, resolution and neutron efficiency performance.

Load Factor, i.e. the volume ratio between the elpasolite particles and the polymer matrix will be investigated. Our preliminary experiments were with 50% to 75% load. The performance of 50% scintillator was slightly better but the results were not conclusive, since the difference could be based on other component of the technology—polymerization process or initial charge. A detailed study will eliminate these variables and will provide the answer to the load question. The goal will be define the maximum possible load without degradation of the light yield.

Figure 9A:
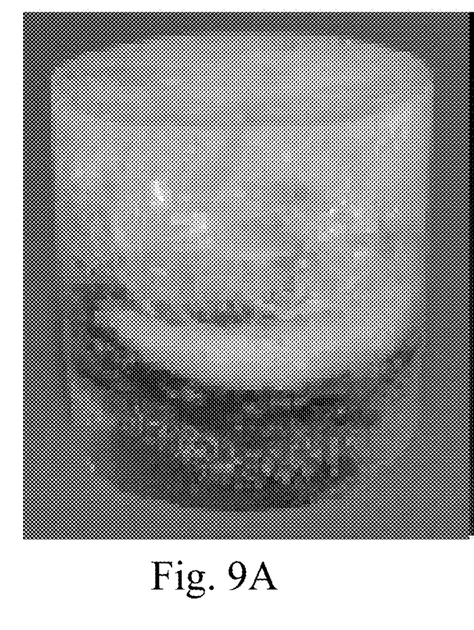
FIG. 9A is a photograph of 1" diameter by 1" composite CLYC-Plastic detectors with a first light guide structure.
Figure 9B:
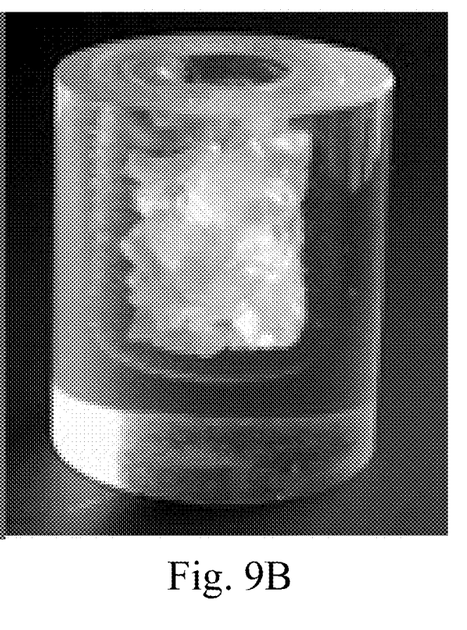
FIG. 9B is a photograph of 1" diameter by 1" composite CLYC-Plastic detectors with a second light guide structure.

Scintillator Structure, which supports the transport of the light from any part of the composite scintillator, is another important aspect of the composite detectors. FIGS. 9A and 9B show two solutions—direct polymerization in the crucible FIG. 9A and polymerization in a well FIG. 9B. In the well technology we produce the composite scintillator in two steps—(1) fabricate the plastic part without any inclusions and drill mechanically a well in it, and (2) place the elpasolite particles and monomer in the well and perform a second polymerization step to completely encapsulate the particles in the plastic matrix. While the two detectors did not show significantly different performance, we believe that the well technology is more promising to produce very long detectors. The shell of the initial plastic part acts as a light guide for the light generated even in the most distant part of the composite scintillator.

Post Processing

The final step in the fabrication of the composite scintillator is post processing. This includes cutting, grinding and polishing of the surfaces to obtain transparent and optically clear samples. Finally the samples are wrapped with Teflon to provide reflective surface.

Gamma Response Evaluation

Energy resolution of 4% and 6% at 662 keV or better with inorganic components CLLBC and CLYC, respectively are expected.

Figure 10:
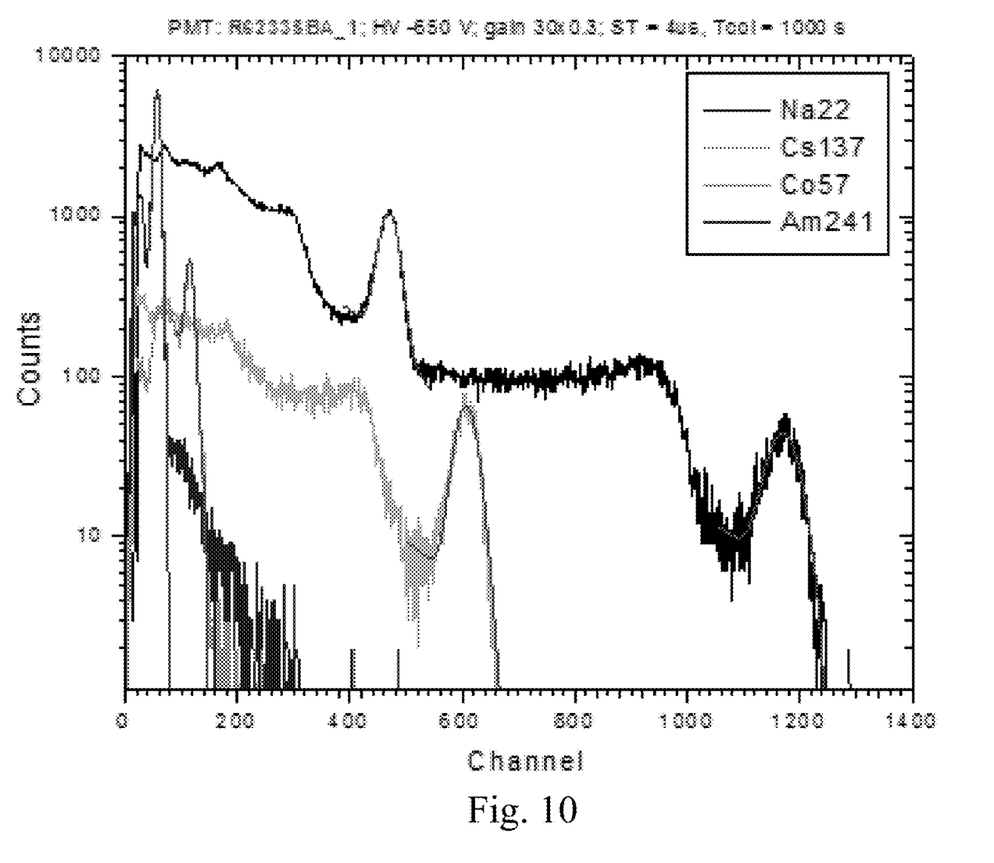
FIG. 10 presents energy spectra under 22Na, 241Am, 57Co and 137Cs irradiation of a 1" diameter by 1" composite CLYC-Plastic detector.

In one example, FIG. 10 shows spectra measured under irradiation with different sources with one of our preliminary composite CLYC-Plastic scintillator (including a volume loading of 75% in the plastic body) with Ø1'×1" dimensions. These measurements are very useful to estimate the impact of the composition and scintillator structure on the light yield and on the linearity of the response.

Proportionality

Figure 11:
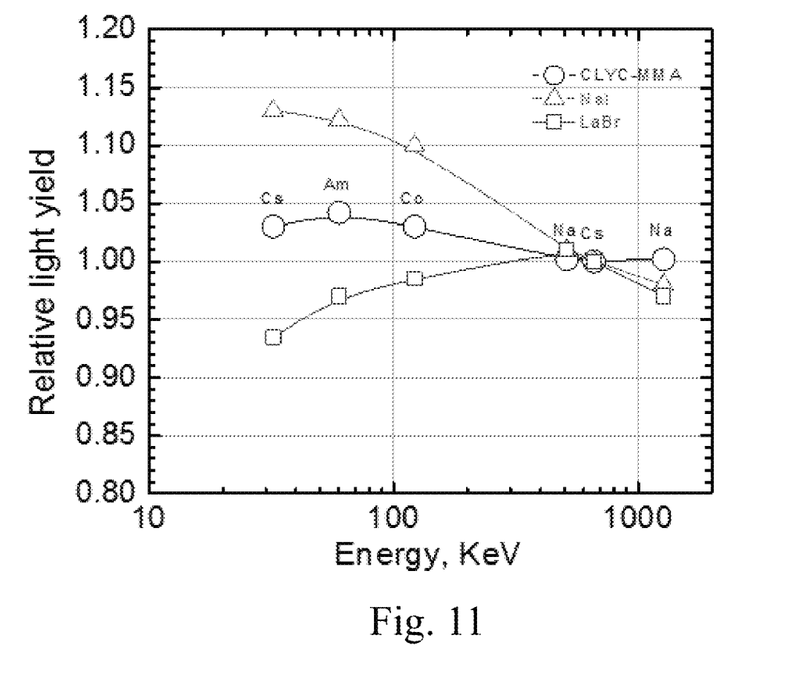
FIG. 11 presents proportionality measurements with different radiation sources irradiating a 1" diameter by 1" composite CLYC-Plastic detector as compared to NaI:Tl and LaBr$_3$ scintillators.

Using collected data, proportionality (light yield versus energy of excitation) of each crystal can be evaluated. FIG. 11 shows the proportionality plot of a Ø1'×1" CLYC-Plastics composite detector measured with sources with different energies. The result indicate that the new composition has excellent linearity of 4% in 30 Kev to 1.2 MeV gamma energies, approaching the results with the other elpasolite scintillators. FIG. 11 also shows for comparison the linearity of two commonly used scintillators—NaI:Tl and LaBr$_3$. The new composite detector shows significantly better linearity, which could explain the good energy resolution regardless of the relatively low light yield.

Thermal Neutron Response Evaluation

Energy Resolution of the thermal neutron peak measured with Am/Be energy spectra are expected to be 6% or better.

Pulse Shape Discrimination (PSD) is based on the difference in the shape of the neutron and gamma signals. FIG. 7A shows a PSD scatter plot recorded for a Ø1"×1" CLYC—

Plastics composite detector under 252Cf excitation. The plot illustrates the excellent separation of different events which is demonstrated by a FOM of 3.0. We will be looking to maintain such high FOM for the prototypes.

Design and Construction of a Desk-Top Detector

We intend to implement a modular design concept, which will provide flexibility to construct the instrument and possibility to optimize the performance of the individual modules with respect to size, power consumption and cost. The following modules will be evaluated for the final conceptual design:

Read out electronics, high voltage and associated control and monitoring module. It will also integrate components for temperature stabilization.

Front-end signal processing. This module will process (shape) the detector signals, and will separate neutron and gamma events using PSD and PHD methods [Gueorguiev 12-2].

ARM based microcontroller for MCA functionality, interfaces, system control and monitoring. For the initial evaluation we plan to use an Atmel Sam3 microcontroller with an ARM core.

We will work out the concept of the user and communication interface, which will be developed and finalized in Phase II. We will consider the requirements for data storage, gamma dose rate, neutron count rate, alarm/warning indication, overload condition, instrument and battery status.

Figure 12:
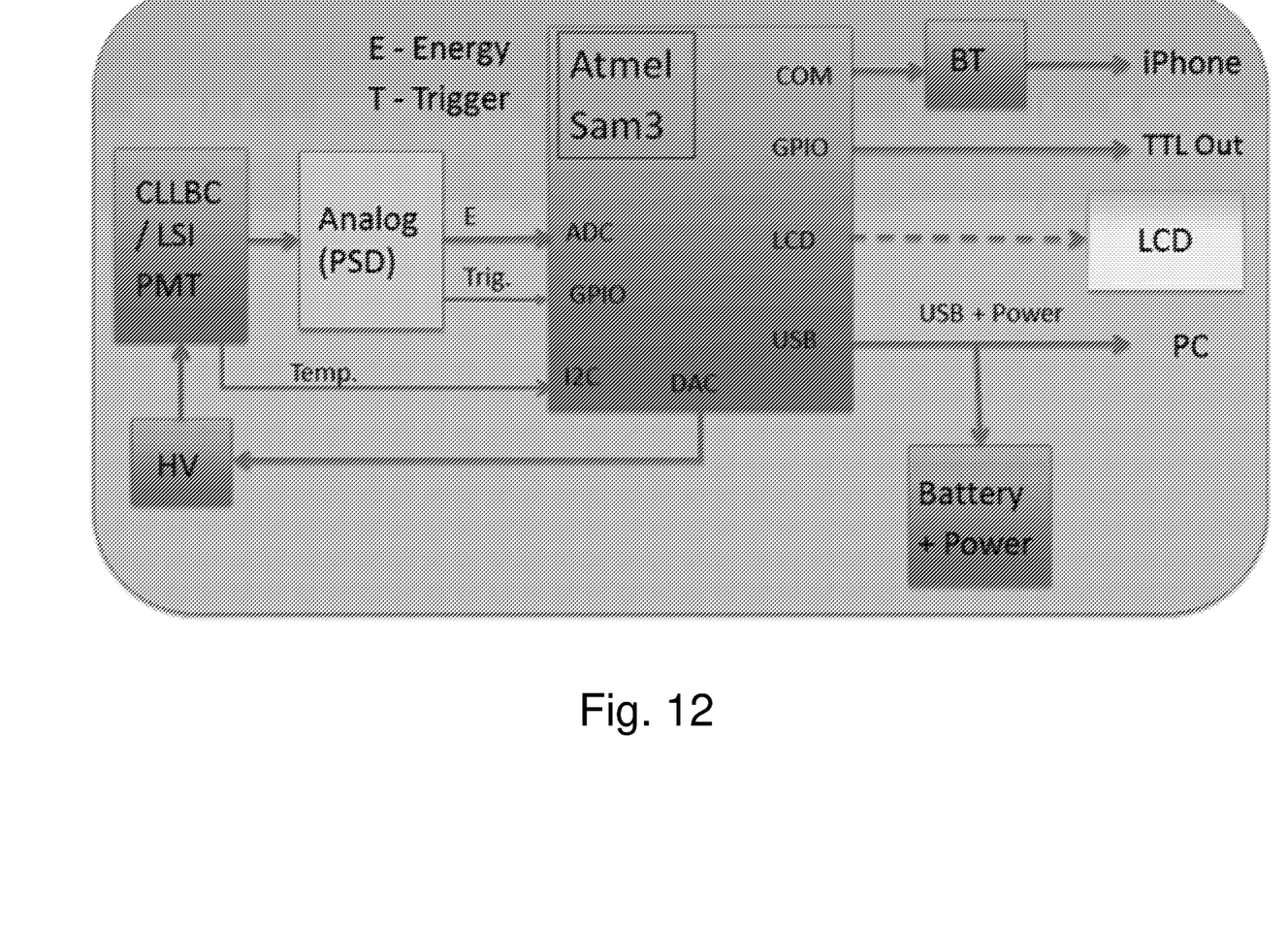
FIG. 12 is a schematic representation of a multimode high resolution radiation detector.

FIG. 12 shows the preliminary concept of the multimode high resolution radiation detector. It has the major components listed above. We will explore the two options of graphical user interface (GUI), an internal LCD or an external display module, e.g. a smart phone. Our preliminary trade-off study indicates that the Atmel-Sam3 processor is the very suitable for this application. It is low power component; has large internal non-volatile FLASH type memory for the program and large internal RAM memory to build the MCA spectra. In addition, it offers a number of built-in interfaces—LCD, USB, UART, Ethernet, I2C, 16-channel ADC and 2-channel DAC. It consumes only a <10 mA current which will provide for long battery life.

The standard serial port (UART—Universal Asynchronous Transmitter/Receiver) will be used to communicate with a Bluetooth module, which will provide connectivity to an external mobile device, e.g. a Smart Phone or iPad. The USB port will be used to communicate with a PC or Laptop. The USB 5V power line will be used to charge the internal rechargeable batteries.

Figure 13A:
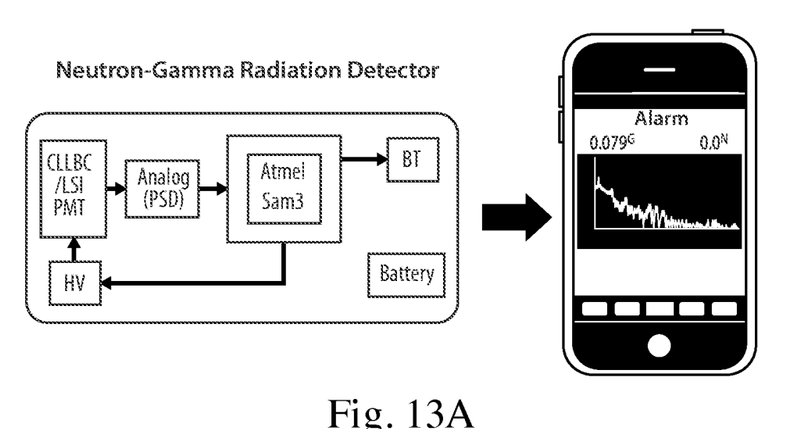
FIG. 13A-13B present a schematic representation of a Graphical user Interface (GUI) based on smart phone.
Figure 13B:
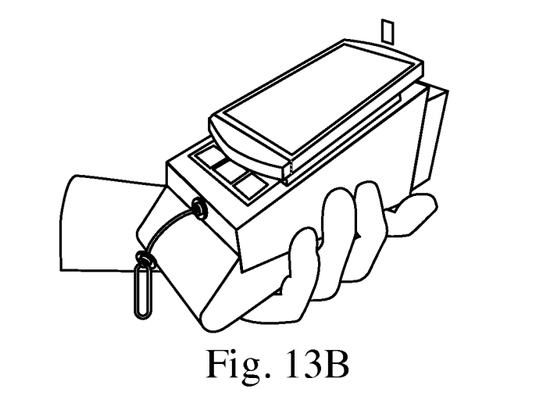

FIGS. 13A and 13B shows the preliminary design concept based on a smart phone or iPad as an external display option. The signal processing and MCA will be performed in the radiation detector. An external smart phone is used as a convenient display. The communication between the radiation detector and the smart phone will be provided through the Bluetooth wireless interface. The details of the concept and the corresponding application for the smart phone will be developed and demonstrated during Phase II.

Example: Gamma Ray Spectroscopy Comparison

Scintillation crystals coupled to photomultiplier tubes are the most common detectors for gamma ray spectroscopy. The choice of scintillator depends on the requirements of the application. Some of the requirements include high stopping efficiency, fast response, high light output, good proportionality, minimal afterglow, low cost, good environmental stability, and, of course, good energy resolution. None of the commercially available inorganic scintillators can satisfy all of these requirements. Table I provides a comparison of the common inorganic scintillators used for gamma ray detection and spectroscopy. For many applications, NaI:Tl is the scintillator of choice. NaI:Tl has high light output, moderate speed, and its emission is well matched to photomultiplier tubes. However, its energy resolution is poor, about 6-7% FWHM at 662 keV. Relatively poor energy resolution is observed in the majority of scintillators developed to date, as seen in the table, which arises from the poor proportionality of these materials, particularly at low energies.

Table I also lists the scintillation properties of CLYC and CLLBC. Our studies indicate that both exhibits excellent proportionality over a wider energy range, even better than $LaBr_3$:Ce. As a result, the energy resolution achieved with CLLBC is comparable to that of $LaBr_3$:Ce, 3% at 662 keV, despite its lower light yield than $LaBr_3$:Ce. Another advantage of CLLBC over $LaBr_3$:Ce is its isotropic cubic elpasolite structure, which implies that the growth of large volume crystals of CLLBC should be easier compared to that of hexagonal compositions. This has been confirmed in our research with another elpasolite, CLYC.

The table also shows the preliminary data for the composite CLYC-Plastic scintillator. The density of 2.7 g/cm3 is based on 75% volume load of CLYC in plastics, which number corresponds to the load which we used in our preliminary experiments. The resolution and light yield are also from our preliminary experiments and we believe that it can be improved by optimization of the technology.

Due to the high light yield, CLLBC could be potentially better candidate for the composite detector. In Phase I we will investigate if the technology, currently prototyped only with CLYC scintillators, will be suitable to CLLBC as well. Since both scintillators are elpasolite we expect that both material can be used to build composite detectors.

TABLE I

| Scintillator | $\lambda$, nm | LY, ph/MeV | Decay time, ns | En. Res. @ 662 keV, % | Density, g/cm$^3$ |
|---|---|---|---|---|---|
| NaI(Tl) | 415 | 38,000 | 230 | 6-7 | 3.67 |
| CsI(Tl) | 540 | 52,000 | 1000 | 6-7 | 4.5 |
| BGO | 505 | 8,200 | 300 | 8 | 7.13 |
| LaCl$_3$:Ce | 330 | 49,000 | 25,210 | 3.5 | 3.8 |
| LaBr$_3$:5% Ce | 360 | 65,000 | 16,330 | 3 | 5.1 |
| CLYC:Ce | 370 | 20,000 | 1, 60,900 | 4 | 3.3 |
| CLLBC:Ce | 410 | 40,000 | 55,270 | 3 | ~4.2 |
| CLYC + Plastics | 370 | 18,000 | 1, 60,900 | 6-7 | ~2.7 |

Example: Neutron Detection

In addition to gamma radiation, neutron detection can provide important information for the identification of fissionable material. The neutrons are usually divided into three categories according to their energy: cold (<25 meV), thermal (~25 meV to 1 eV), and fast neutrons (>1 eV).

Because neutrons are electrically neutral, their detection is difficult. However, some isotopes such as $^3$He, $^6$Li, $^{10}$B, and $^{157}$Gd have large cross sections for thermal neutron absorption, and useful neutron detectors can be developed by incorporating these isotopes as constituents. Each absorption process (followed by a reaction) is characterized by: cross section, Q value, and reaction products. Table II lists these variables for $^6$Li and $^3$He isotopes [Convert].

Critical for our purposes, the $^6$Li interaction produces charged particles (an alpha particle and a triton with total energy of 4.78 MeV) that are readily absorbed in the scintillator, producing a bright flash. Despite a modest cross-section of $^6$Li for thermal neutron capture, usually less than 1 cm of $^6$Li material is enough to absorb the majority of neutrons (~80%). This characteristics, and the additional fact that some Li based scintillators allow for gamma neutron discrimination, make them an excellent choice for thermal neutron detection.

A comparison of intrinsic neutron scintillators incorporating Li ions is provided in Table III. CLLBC shows light yield of 120,000 photons/neutron. Only LiF/ZnS:Ag phosphor has comparable light yield, which in thick specimens is degraded due to a light absorption.

It is important to note that multi-mode detection requires a scintillator to both register and distinguish between different types of radiation. Among the listed materials, clearly CLYC and CLLBC are the best candidates, with CLLBC having an advantage of better energy resolution.

In addition to scintillator detectors, there are two other main classes of thermal neutron detectors: semiconductor based and $^3$He tubes. None of these detectors are capable of detecting gamma and neutron particles simultaneously, making them unsuitable for dual mode operation.

The presence of a plastic scintillation matrix required to incorporate inorganic material can be utilized to detect fast neutrons. A brief discussion of the fast neutron detection methods follows.

As discussed in the previous section neutrons with energies >1 eV are considered fast. At these energies the detection of neutrons is based on the scattering of neutrons on hydrogen isotopes. Hydrogen is the preferred nuclide to use because a colliding neutron can transfer part or all of its kinetic energy to the proton in one collision. This implies that the average recoil proton energy will be half the initial neutron energy. Hydrogen has a cross section of about 20 barns for neutrons in the energy range between 1 eV and 10 keV. From 10 keV up to 10 MeV the neutron cross section decreases to about 1 barn, however it is still the highest of all isotopes.

Plastic scintillators are readily available in large sizes at low cost and are very safe to handle. The main limitation of commercially available plastic scintillators such as BC him him-408 is their inability to provide efficient neutron/gamma PSD. Fortunately, recent research at RMD and LLNL has shown that large plastic scintillators based on polystyrene and polyvinyltoluene, respectively, doped with PPO can provide effective neutron/gamma PSD. As shown in Table IV, RMD's plastic scintillators have a high light output (higher than BGO), a fast scintillation decay and exhibit excellent neutron/gamma PSD.

TABLE II

| | Reaction | Q value | $\sigma_{th}$ (barns) |
|---|---|---|---|
| $^3$He | $_2^3$He + $_0^1$n → $_1^3$H + $_1^1$p | 0.764 | 5330 |
| $^6$Li | $_3^6$Li + $_0^1$n → $_1^3$H + $_2^4\alpha$ | 4.78 | 940 |

TABLE III

| Material | Light yield, photons per | | GEE, MeV | decay time, ns | density, g/cm$^3$ | PSD |
|---|---|---|---|---|---|---|
| | neutron | 1 MeV γ-ray | | | | |
| Li-Glass | 6,000 | 4,000 | 1.5 | 75 | 2.5 | No |
| LiF/ZnS:Ag | 160,000 | 50,000 | — | 1,000 | 2.6 | N/Y |
| LiI:Eu | 15,000 | 52,000 | 3.5 | 1,200 | 4.08 | No |
| CLYC:Ce | 70,000 | 20,000 | 3.3 | $1^{CVL}$; 60; 900 | 3.3 | Yes |
| CLLBC:Ce | 120,000 | 40,000 | 3.2 | 55, 270 | ~4.2 | Yes |
| CLYC + Plastics | 60,000 | 18,000 | 3.1 | 55, 270 | ~2.5 | Yes |

TABLE IV

| Scintillator | λ nm | Light yield ph/MeV | Decay time ns | PSD |
|---|---|---|---|---|
| BC-408 plastic | 425 | 12,800 | 2.1 | poor |
| BC-501A liquid | 425 | 15,600 | 3.2 | very good |
| Anthracene | 445 | 20,000 | 30 | poor |
| Stilbene | 380 | 14,000 | 3.5 | good |
| RMD Plastic | 450 | 13,000 | <10 | very good |

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

What is claimed is:

1. A composite scintillator comprising:
   a plastic matrix material; and
   a scintillator material comprised of one or more single crystal pieces of CLYC or CLLBC encapsulated in the plastic matrix material, wherein the one or more pieces have a size of greater than 200 micron.

2. The composite scintillator of claim 1, wherein the scintillator material comprises single crystal pieces of CLYC.

3. The composite scintillator of claim 1, wherein the scintillator material comprises single crystal pieces of CLLBC.

4. The composite scintillator of claim 1, wherein the solid loading is between 50% and 75% inclusively.

5. The composite scintillator of claim 1, wherein the pieces have a characteristic size of less than about 2 mm.

6. A hand-held dual gamma/neutron detector comprising the composite scintillator of claim 1.

* * * * *